(12) United States Patent
Liu

(10) Patent No.: US 11,054,668 B2
(45) Date of Patent: Jul. 6, 2021

(54) DISPLAYING DEVICE, AND DISPLAYING METHOD THEREOF

(71) Applicant: BOE Technology Group Co., Ltd., Beijing (CN)

(72) Inventor: Jiayao Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 331 days.

(21) Appl. No.: 16/149,682

(22) Filed: Oct. 2, 2018

(65) Prior Publication Data
US 2019/0121149 A1 Apr. 25, 2019

(30) Foreign Application Priority Data
Oct. 23, 2017 (CN) .......................... 201710992255.4

(51) Int. Cl.
*G02B 30/27* (2020.01)
(52) U.S. Cl.
CPC .................................. *G02B 30/27* (2020.01)
(58) Field of Classification Search
CPC ........ G02B 30/20; G02B 30/24; G02B 30/26; G02B 30/27; G02B 30/28
See application file for complete search history.

(56) References Cited

U.S. PATENT DOCUMENTS

| 6,377,295 B1 * | 4/2002 | Woodgate | H04N 13/351 348/59 |
| 6,859,256 B2 * | 2/2005 | Montgomery | H04N 13/32 355/22 |
| 2004/0239758 A1 * | 12/2004 | Schwerdtner | H04N 13/376 348/51 |
| 2011/0249093 A1 * | 10/2011 | Yeh | G02B 5/201 348/46 |

(Continued)

FOREIGN PATENT DOCUMENTS

| CN | 102256147 A | 11/2011 |
| CN | 102917231 A | 2/2013 |

(Continued)

OTHER PUBLICATIONS

Chinese Office Action for corresponding application 201710992255.4 dated Mar. 24, 2020.
(Continued)

*Primary Examiner* — Ephrem Z Mebrahtu
(74) *Attorney, Agent, or Firm* — Arent Fox LLP; Michael Fainberg

(57) ABSTRACT

Disclosed are a display device, and a displaying method thereof. The display device includes: a display panel including a plurality of pixel elements; a lens array arranged on the light exit side of the display panel; and a variable light-valve arranged between the display panel and the lens array, including a plurality of first light dimmers and second light dimmers, wherein the respective first light dimmers are (Continued)

located between the pixel elements and a left-eye watching area, and the respective second light dimmers are located between the pixel elements and a right-eye watching area; and the first light dimmers are operable in a light-transmitting or light-shielding state, and the second light dimmers are operable in a light-transmitting or light-shielding state.

8 Claims, 3 Drawing Sheets

(56) References Cited

U.S. PATENT DOCUMENTS

| | | | | |
|---|---|---|---|---|
| 2012/0086776 | A1* | 4/2012 | Lo | H04N 13/307 |
| | | | | 348/46 |
| 2014/0043448 | A1* | 2/2014 | Lee | H04N 13/31 |
| | | | | 348/51 |
| 2014/0092329 | A1* | 4/2014 | Odake | H04N 13/376 |
| | | | | 349/15 |
| 2016/0116752 | A1* | 4/2016 | Wu | G02B 27/0093 |
| | | | | 359/462 |
| 2018/0314075 | A1 | 11/2018 | Zhang et al. | |
| 2018/0348564 | A1* | 12/2018 | Lin | G02F 1/1341 |

FOREIGN PATENT DOCUMENTS

| | | |
|---|---|---|
| CN | 104297994 A | 1/2015 |
| CN | 206002779 U | 3/2017 |
| CN | 206057760 U | 3/2017 |
| CN | 206057761 U | 3/2017 |
| CN | 106896519 A | 6/2017 |

OTHER PUBLICATIONS

SIPO, "First Office Action," issued in connection with Application No. 201710992255.4, dated Jul. 2, 2019, 19 pages.

* cited by examiner

DISPLAYING DEVICE, AND DISPLAYING METHOD THEREOF

CROSS-REFERENCE TO RELATED APPLICATION

This application claims priority of Chinese Patent Application No. 201710992255.4, filed on Oct. 23, 2017, which is hereby incorporated by reference in its entirety.

FIELD

The present disclosure relates to the field of display technology, and particularly to a display device, and a displaying method thereof.

BACKGROUND

At present, a 3D image can be displayed to naked eyes through a naked eye 3D display device, where light emitted by pixels enter the respective human eyes through corresponding micro-lenses.

SUMMARY

Embodiments of the disclosure provide the following technical solutions.

An embodiment of the disclosure provides a display device, the display device including:

a display panel including a plurality of pixel elements;

a lens array arranged on a light exit side of the display panel; and a variable light-valve arranged between the display panel and the lens array, the variable light-valve includes a plurality of first light dimmers and second light dimmers, wherein each of the first light dimmers is located between the pixel elements and a left-eye watching area, and each of the second light dimmers is located between the pixel elements and a right-eye watching area; the first light dimmers are operable in a light-transmitting or light-shielding state, and the second light dimmers are operable in a light-transmitting or light-shielding state; while a left-eye image is being displayed at the pixel elements of the display panel, the first light dimmers are in the light-transmitting state, and the second light dimmers are in the light-shielding state; and while a right-eye image is being displayed at the pixel elements 1 of the display panel, the first light dimmers are in the light-shielding state, and the second light dimmers are in the light-transmitting state.

Optionally, the first light dimmers and the second light dimmers in the variable light valve are distributed in an array.

Optionally, the first light dimmers and the second light dimmers in the variable light value valve have a strip-shaped structure extending in a column direction of the pixel elements, and the first light dimmers and the second light dimmers are alternately arranged in a row direction of the pixel elements.

Optionally, the variable light valve has a liquid crystal cell structure, and the first light dimmers and the second light dimmers are liquid crystal light dimmers.

Optionally, in the liquid crystal cell structure, a substrate of the liquid crystal cell facing the display panel, and a substrate on the light exit side of the display panel share a same substrate.

Optionally, the variable light-valve includes a mechanical grating structure, and the first light dimmers and the second light dimmers are mechanical grating tuning structures.

Optionally, the variable light-valve includes: first adjusting gratings corresponding to the first light dimmers in a one-to-one manner, wherein when the first adjusting gratings are in a first state, the first light dimmers is in the light-transmitting state, and when the first adjusting gratings are rotated into a second state, the first light dimmers are in the light-shielding state; second adjusting gratings corresponding to the second light dimmers in a one-to-one manner, wherein when the second adjusting gratings are in a first state, the second light dimmers are in the light-transmitting state, and when the second adjusting gratings are rotated into a second state, the second light dimmers are in the light-shielding state; and a driver configured to control the first adjusting gratings and the second adjusting gratings to operate.

Optionally, the first adjusting gratings and the second adjusting gratings are connected through a linkage.

An embodiment of the disclosure provides a displaying method for the display device according to any one of the technical solutions above, the method including:

controlling the first light dimmers and the second light dimmers in the variable light-valve to be switched between the light-transmitting state and the light-shielding state to control the pixel elements in the display panel to be switched between the left-eye image and the right-eye image, wherein:

while the left-eye image is being displayed at the pixel elements of the display panel, the first light dimmers are in the light-transmitting state, and the second light dimmers are in the light-shielding state; and while the right-eye image is being displayed at the pixel elements of the display panel, the first light dimmers are in the light-shielding state, and the second light dimmers are in the light-transmitting state.

DETAILED DESCRIPTION OF THE EMBODIMENTS

The technical solutions according to embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those ordinarily skilled in the art without any inventive effort shall fall into the claimed scope of the disclosure.

When a 3D image is displayed to naked eyes through a naked eye 3D display device, the light emitted by the pixels may enter the other human eyes through the micro-lenses which do not correspond thereto, and in this case, the human eyes may be restricted to a small visible space to thereby avoid crosstalk.

Figure 1:
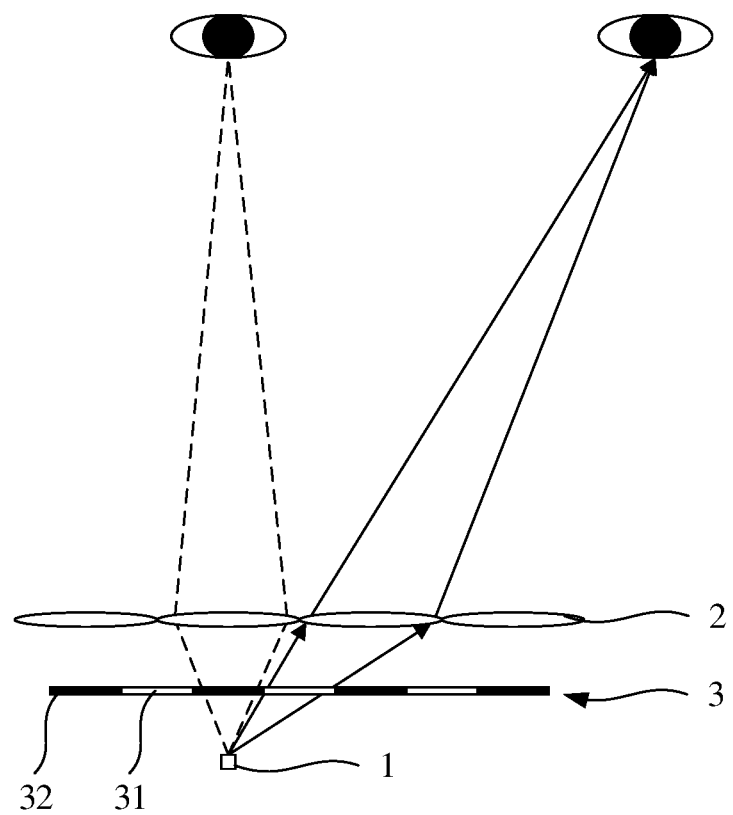
FIG. 1 is a schematic diagram of a path for displaying a left-eye image in a display device according to an embodiment of the disclosure.
Figure 2:
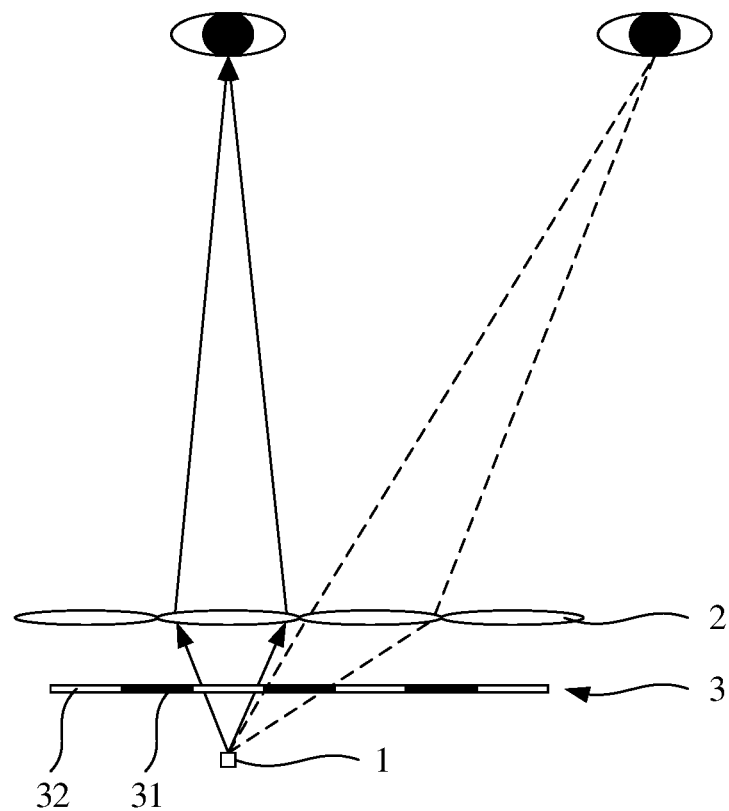
FIG. 2 is a schematic diagram of a path for displaying a right-eye image to the right eye in the display device according to the embodiment of the disclosure.

Referring to FIG. 1 and FIG. 2, an embodiment of the disclosure provides a display device, where the display device includes:

a display panel including a plurality of pixel elements 1;

a lens array 2 arranged on the light exit side of the display panel; and a variable light-valve 3 arranged between the display panel and the lens array 2, including a plurality of first light dimmers 31 and second light dimmers 32, where the respective first light dimmers 31 are located between the pixel elements 1 and a left-eye watching area, and the respective second light dimmers 32 are located between the pixel elements 1 and a right-eye watching area; the first light dimmers 31 are operable in a light-transmitting or light-shielding state, and the second light dimmers 32 are operable in a light-transmitting or light-shielding state; while a left-eye image is being displayed at the pixel elements 1 of the display panel, the first light dimmers 31 are in the light-transmitting state, and the second light dimmers 32 are in the light-shielding state; and while a right-eye image is being displayed at the pixel elements 1 of the display panel, the first light dimmers 31 are in the light-shielding state, and the second light dimmers 32 are in the light-transmitting state.

The display device according to the embodiment of the disclosure includes: a display panel including a plurality of pixel elements; a lens array arranged on the light exit side of the display panel; and a variable light-valve arranged between the display panel and the lens array, including a plurality of first light dimmers and second light dimmers, where the respective first light dimmers are located between the pixel elements and a left-eye watching area, and the respective second light dimmers are located between the pixel elements and a right-eye watching area; while a left-eye image is being displayed at the pixel elements 1 of the display panel, as illustrated in FIG. 1, the first light dimmers 31 are in a light-transmitting state, and the second light dimmers 32 are in a light-shielding state, so that the first light dimmers 31 can enable light rays emitted by the pixel elements 1 to enter the left eye through a corresponding area of the lens array 2, and the second light dimmers 32 can block the light emitted by the pixel elements 1 from entering the right eye through another area than the corresponding area of the lens array 2, thus avoiding crosstalk to the right eye from occurring; and while a right-eye image is being displayed at the pixel elements 1 of the display panel, as illustrated in FIG. 2, the first light dimmers 31 are in the light-shielding state, and the second light dimmers 32 are in the light-transmitting state, so that the second light dimmers 32 can enable light rays emitted by the pixel elements 1 to enter the right eye through a corresponding area of the lens array 2, and the first light dimmers 31 can block the light emitted by the pixel elements 1 from entering the left eye through another area than the corresponding area of the lens array 2, thus avoiding crosstalk to the left eye from occurring. Accordingly, the variable light value valve 3 can be arranged to control the light rays emitted by the pixel elements 1 to lie in a corresponding micro-lens range to thereby avoid crosstalk to another eye than a corresponding eye while a 3D image is being displayed.

In the display device according to the embodiment of the disclosure, the first light dimmers 31 and the second light dimmers 32 in the variable light value valve 3 can be distributed in an array so that a distribution pattern of the first light dimmers 31 and the second light dimmers 32 can be set as needed in reality to thereby divide the entire display area into a plurality of areas distributed in an array.

In the display device according to the embodiment of the disclosure, the first light dimmers 31 and the second light dimmers 32 in the variable light value valve 3 have a strip-shaped structure extending in the column direction of the pixel elements 1, and the first light dimmers 31 and the second light dimmers 32 are alternately arranged in the row direction of the pixel elements 1, where the first light dimmers 31 and the second light dimmers 32 are arranged alternately and uniformly, so that light rays emitted by each pixel element 1 in the display panel can be controlled to lie in a corresponding area of the lens array 2 to thereby avoid crosstalk in a large area, extend a visible space of the display device, and improve a 3D display effect.

In the display device according to the embodiment of the disclosure, the variable light valve 3 has a liquid crystal cell structure, and the first light dimmers 31 and the second light dimmers 32 are liquid crystal light dimmers, where since liquid crystals have zero radiation, low energy consumption, low thermal dissipation, a small thickness, a low weight, and space-economical, and reproduce an image precisely without any geometrical distortion, and stably without any flickering, in a large visible area, etc., the 3D display effect can be further improved.

In the display device according to the embodiment of the disclosure, in the liquid crystal cell structure, a substrate of the liquid crystal cell facing the display panel, and a substrate on the light exit side of the display panel share the same substrate, and this arrangement can reduce the number of process steps, save a fabrication material, and reduce the thickness of the display panel.

Figure 3:
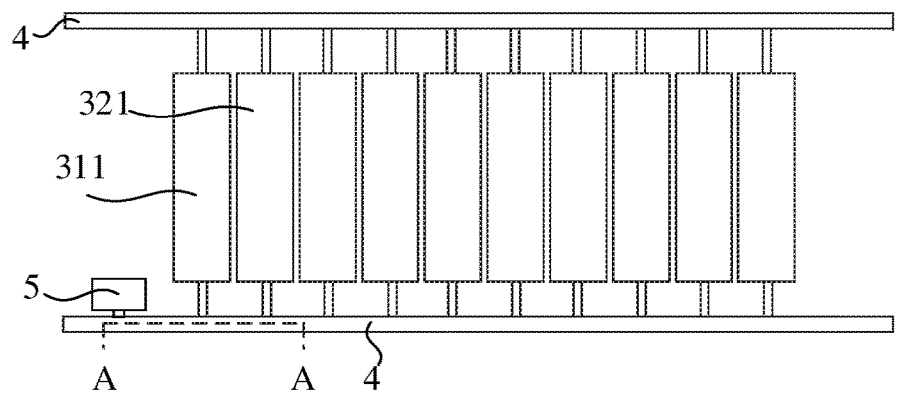
FIG. 3 is a schematic structural diagram of a mechanical grating structure according to an embodiment of the disclosure.

In the display device according to the embodiment of the disclosure, optionally, the variable light-valve 3 can alternatively be arranged in a mechanical grating structure, and as illustrated in FIG. 3, the first light dimmers 31 and the second light dimmers 32 are grating tuning structures; and the mechanical grating structures are simple in structure, and easy to maintain, thus saving a cost.

In the display device according to the embodiment of the disclosure, when the variable light-valve 3 is a mechanical grating structure, the variable light-valve 3 includes: first adjusting gratings 311 corresponding to the first light dimmers 31 in a one-to-one manner, where when the first adjusting gratings 311 are in a first state, the first light dimmers 31 is in the light-transmitting state, and when the first adjusting gratings 311 are rotated into a second state, the first light dimmers 31 are in the light-shielding state; second adjusting gratings 321 corresponding to the second light dimmers 32 in a one-to-one manner, where when the second adjusting gratings 321 are in a first state, the second light dimmers 32 are in the light-transmitting state, and when the second adjusting gratings 321 are rotated into a second state, the second light dimmers 32 are in the light-shielding state; and a driver configured to control the first adjusting gratings 311 and the second adjusting gratings 312 to operate, where the different states of the first adjusting gratings 311 and the second adjusting gratings 312 can be switched to thereby adjust the light rays emitted by the pixel elements 1 into a corresponding area of the lens array 2 so as to avoid crosstalk from occurring while an image is being displayed.

In the display device according to the embodiment of the disclosure, the first adjusting gratings 311 and the second adjusting gratings 312 are connected through a linkage 33, and the second adjusting gratings 312 are controlled through the linkage 33 to operate, while the first adjusting gratings 311 are operating.

Figure 4:
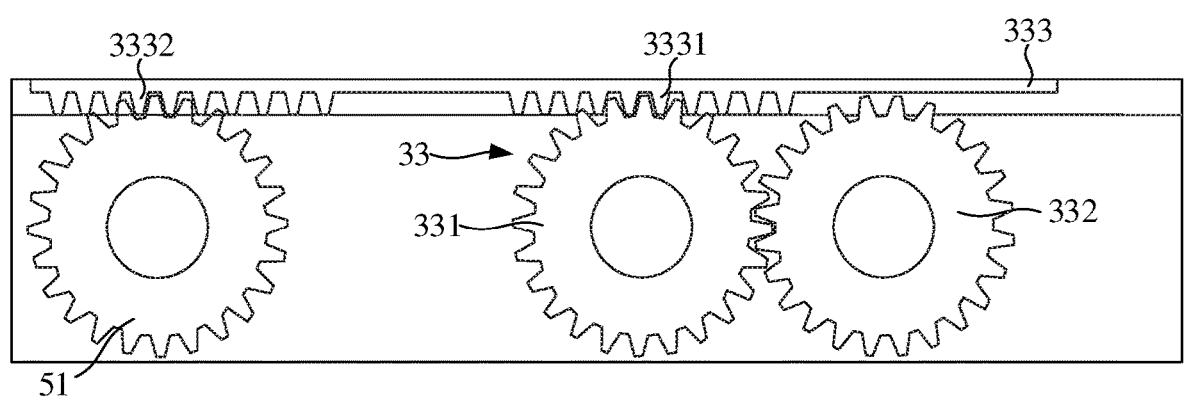
FIG. 4 is a schematic structural diagram of a linkage according to an embodiment of the disclosure.

As illustrated in FIG. 3 and FIG. 4, FIG. 4 is a sectional view of the mechanical gratings along AA in FIG. 3.

Both the first adjusting gratings 311 and the second adjusting gratings 312 are pivoted on a bracket 4 though pivots, a transmission gear 331 is arranged on the pivots of the first adjusting gratings 311, and a driven gear 332 is arranged on the pivot of each second adjusting grating 321, so that both a first adjusting grating 311 and a second adjusting grating 322 adjacent thereto are linked through the transmission gear 331 and the driven gear 332, that is, the linkage 33 can be composed of the transmission gear 331 and the driven gears 332.

As illustrated in FIG. 3 and FIG. 4, the driver can include a driving motor 5 installed on the bracket, and a rack 333 in slidable cooperation with the bracket; a driving gear 51 is arranged on an output shaft of the driving motor 5, and the rack 333 includes first tooth 3332 engaged with the driving gear 51, and second teeth 3331 engaged with the transmission gear 331 arranged on the pivots of the first adjusting gratings 311; and while the driving gear 51 is being brought by the driving motor 5 into operation, the rack 333 is brought into sliding relative to the bracket 4, and the second tooth 3332 of the rack 333 are further brought into movement. Since the transmission gear 331 arranged on the pivots of the first adjusting gratings 311 is engaged with the second tooth 3331 of the rack 333, the transmission gear 331 is brought by the rack 333 into rotation, and the first adjusting gratings 311 are further driven to switch the state; and also since the transmission gear 331 is engaged with the driven gears 332, the driven gears 332 rotate under the linkage of the transmission gear 331, so the second adjusting gratings 321 are brought by the driven gears 332 to have the state thereof switched. Stated otherwise, when the first adjusting gratings 311 are switched from the light-shielding state to the light-transmitting state, the second adjusting gratings 321 are controlled by the linkage 33 to be switched from the light-transmitting state to the light-shielding state, so that the state of the gratings can be adjusted rapidly to thereby enable the light emitted by the display panel to be distributed uniformly at different positions in the display area so as to improve the display effect, and the number of driving modules for controlling the first adjusting gratings and the second adjusting gratings in the variable light-valve can be reduced to thereby simplify the structure of the variable light-valve.

Optionally, the first adjusting gratings 311 and the second adjusting gratings 312 may alternatively not be linked through the linkage 33, but a transmission gear connected with the pivots of the first adjusting gratings 311 is arranged on a bracket 4, and a transmission gear connected with the pivots of the second adjusting gratings 321 is arranged on another bracket 4; and a racket for bringing the transmission gear of the first adjusting gratings 311 into operation, and a racket for bringing the transmission gear of the second adjusting gratings 321 into operation are arranged respectively on the two brackets 4, and are controlled by synchronous driving motors to operate at the same time, so that the states of the first adjusting gratings 311 and the second adjusting gratings 312 can be switched in synchronization.

It shall be noted that of the mechanical gratings, the first adjusting gratings 311 and the second adjusting gratings 312 are located in the display area of the display panel, and the other components for controlling the first adjusting gratings 311 and the second adjusting gratings 312 to operate are arranged in a non-display area thereof.

An embodiment of the disclosure further provides a displaying method for the display device according to any one of the embodiments above of the disclosure, where the method particularly includes the following steps:

controlling the first light dimmers 31 and the second light dimmers 32 in the variable light-valve 3 to be switched between the light-transmitting state and the light-shielding state to control the pixel elements 1 in the display panel to be switched between the left-eye image and the right-eye image, where:

while the left-eye image is being displayed at the pixel elements 1 of the display panel, the first light dimmers 31 are in the light-transmitting state, and the second light dimmers 32 are in the light-shielding state; and while the right-eye image is being displayed at the pixel elements 1 of the display panel, the first light dimmers 31 are in the light-shielding state, and the second light dimmers 32 are in the light-transmitting state.

In the displaying method above for a display device according to the embodiment of the disclosure, while the left-eye image is being displayed at the pixel elements 1 of the display panel, as illustrated in FIG. 1, the first light dimmers 31 are in the light-transmitting state, and the second light dimmers 32 are in the light-shielding state, so that the first light dimmers 31 can enable light rays emitted by the pixel elements 1 to enter the left eye through a corresponding area of the lens array 2, and the second light dimmers 32 can block the light emitted by the pixel elements 1 from entering the right eye through another area than the corresponding area of the lens array 2, thus avoiding crosstalk to the right eye from occurring; and while the right-eye image is being displayed at the pixel elements 1 of the display panel, as illustrated in FIG. 2, the first light dimmers 31 are in the light-shielding state, and the second light dimmers 32 are in the light-transmitting state, so that the second light dimmers 32 can enable light rays emitted by the pixel elements 1 to enter the right eye through a corresponding area of the lens array 2, and the first light dimmers 31 can block the light emitted by the pixel elements 1 from entering the left eye through another area than the corresponding area of the lens array 2, thus avoiding crosstalk to the left eye from occurring. The pixel elements 1 in the display panel are controlled to be switched between the left-eye image and the right-eye image, and also the first light dimmers 31 and the second light dimmers 32 in the variable light-valve 3 are controlled to be switched between the light-transmitting state and the light-shielding state at the same frequency, thus greatly extending a visible space of the display device.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display device, comprising:
    a display panel comprising a plurality of pixel elements;
    a lens array arranged on a light exit side of the display panel; and
    a variable light-valve arranged between the display panel and the lens array, the variable light-valve comprising a plurality of first light dimmers and second light dimmers, wherein each of the first light dimmers is located between the pixel elements and a left-eye watching area, and each of the second light dimmers is located between the pixel elements and a right-eye watching area; the first light dimmers are operable in a light-transmitting or light-shielding state, and the second light dimmers are operable in a light-transmitting or light-shielding state; while a left-eye image is being displayed at the pixel elements of the display panel, the first light dimmers are in the light-transmitting state, and the second light dimmers are in the light-shielding state; and while a right-eye image is being displayed at the pixel elements of the display panel, the first light dimmers are in the light-shielding state, and the second light dimmers are in the light-transmitting state;

wherein the variable light-valve comprises a mechanical grating structure, and the first light dimmers and the second light dimmers are mechanical grating tuning structures; and the variable light-valve comprises:

first adjusting gratings corresponding to the first light dimmers in a one-to-one manner, wherein when the first adjusting gratings are in a first state, the first light dimmers is in the light-transmitting state, and when the first adjusting gratings are rotated into a second state, the first light dimmers are in the light-shielding state;

second adjusting gratings corresponding to the second light dimmers in a one-to-one manner, wherein when the second adjusting gratings are in a first state, the second light dimmers are in the light-transmitting state, and when the second adjusting gratings are rotated into a second state, the second light dimmers are in the light-shielding state; and a driver configured to control the first adjusting gratings and the second adjusting gratings to operate.

2. The display device according to claim 1, wherein the first light dimmers and the second light dimmers in the variable light valve are distributed in an array.

3. The display device according to claim 1, wherein the first light dimmers and the second light dimmers in the variable light valve have a strip-shaped structure extending in a column direction of the pixel elements, and the first light dimmers and the second light dimmers are alternately arranged in a row direction of the pixel elements.

4. The display device according to claim 1, wherein the first adjusting gratings and the second adjusting gratings are connected through a linkage.

5. A displaying method for the display device according to claim 1, the method comprising:

controlling the first light dimmers and the second light dimmers in the variable light-valve to be switched between the light-transmitting state and the light-shielding state to control the pixel elements in the display panel to be switched between the left-eye image and the right-eye image, wherein:

while the left-eye image is being displayed at the pixel elements of the display panel, the first light dimmers are in the light-transmitting state, and the second light dimmers are in the light-shielding state; and while the right-eye image is being displayed at the pixel elements of the display panel, the first light dimmers are in the light-shielding state, and the second light dimmers are in the light-transmitting state.

6. The displaying method according to claim 5, wherein the first light dimmers and the second light dimmers in the variable light-valve are distributed in an array.

7. The displaying method according to claim 5, wherein the first light dimmers and the second light dimmers in the variable light valve have a strip-shaped structure extending in a column direction of the pixel elements, and the first light dimmers and the second light dimmers are alternately arranged in a row direction of the pixel elements.

8. The displaying method according to claim 6, wherein the first adjusting gratings and the second adjusting gratings are connected through a linkage.

\* \* \* \* \*